United States Patent
Ye et al.

(10) Patent No.: US 9,146,171 B1
(45) Date of Patent: Sep. 29, 2015

(54) AUTO CALIBRATION METHOD AND APPARATUS FOR WHEEL BALANCER EQUIPMENT

(71) Applicant: Hennessy Industries, Inc., LaVergne, TN (US)

(72) Inventors: Scott Ye, LaVergne, TN (US); James Marler, LaVergne, TN (US); Craig Bond, LaVergne, TN (US)

( * ) Notice: Subject to any disclaimer, the term of this patent is extended or adjusted under 35 U.S.C. 154(b) by 315 days.

(21) Appl. No.: 13/774,174

(22) Filed: Feb. 22, 2013

Related U.S. Application Data

(60) Provisional application No. 61/601,724, filed on Feb. 22, 2012.

(51) Int. Cl.
*G01M 1/02* (2006.01)
*G01M 1/16* (2006.01)

(52) U.S. Cl.
CPC .. *G01M 1/16* (2013.01); *G01M 1/02* (2013.01)

(58) Field of Classification Search
CPC ....... G01M 1/225; G01M 1/326; G01M 1/02; G01M 1/30; G01M 1/10
See application file for complete search history.

(56) References Cited

U.S. PATENT DOCUMENTS

| | | | | |
|---|---|---|---|---|
| 3,910,121 A | * | 10/1975 | Curchod et al. | 73/462 |
| 4,085,619 A | * | 4/1978 | Shapiro et al. | 73/462 |
| 5,054,918 A | * | 10/1991 | Downing et al. | 356/139.09 |
| 5,189,912 A | * | 3/1993 | Quinlan et al. | 73/462 |
| 5,542,294 A | * | 8/1996 | Douglas | 73/462 |
| 5,723,767 A | * | 3/1998 | Rogers et al. | 73/1.14 |
| 7,882,739 B1 | * | 2/2011 | Truex | 73/460 |

FOREIGN PATENT DOCUMENTS

JP 02186231 A * 7/1990

\* cited by examiner

*Primary Examiner* — David A Rogers
(74) *Attorney, Agent, or Firm* — Patterson Intellectual Property Law, P.C.; Mark J. Patterson

(57) ABSTRACT

A method of calibrating an electronic wheel balancer includes mounting a calibration wheel on the balancer shaft, the calibration wheel including mounting pins configured to engage mounting holes on a face plate. The balancer emits a visible towards the calibration wheel, the beam indicating a home position for an inner plane calibration weight on the calibration wheel. The calibration wheel is rotated to the home position and an inner weight plane calibration weight is attached to the calibration wheel. The balancer shaft is automatically rotated to obtain sensor data from force transducers on the balancer. Using the sensor data, the balancer automatically calculates and stores inner weight plane reference data. The motor shaft is stopped and the inner plane calibration weight is moved to an outer weight plane position on the calibration wheel. The shaft is again automatically rotated so that the balancer can obtain more sensor data from the force transducers and automatically calculate and store outer weight plane reference data.

1 Claim, 6 Drawing Sheets

AUTO CALIBRATION METHOD AND APPARATUS FOR WHEEL BALANCER EQUIPMENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. Provisional Patent Application No. 61/601,724 entitled "An Auto Calibration Method and its Apparatus for Wheel Balancers," filed Feb. 22, 2012.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to methods and devices for balancing vehicle wheel and tire assemblies. More particularly, the present invention pertains to methods and devices for calibrating an electronic wheel balancer apparatus.

Electronic wheel balancers are well known in the art. An example of a conventional wheel balancer 10 is shown in FIGS. 1 and 2. Typically, such a balancer 10 will include a housing or base unit 11 and an operator panel 12 mounted above the base unit. The base unit will contain control electronics, sensors, and an electric motor (not shown). The electric motor shaft 13 will extend laterally outside the base unit 11. A hub and faceplate assembly 14 will be affixed to the shaft to accommodate the mounting of a vehicle tire and wheel assembly for balancing.

A typical arrangement of a control system 20 for an electronic wheel balancer is shown in FIG. 6. An AC/DC power supply and safety module 21 is configured to receive power from the AC grid and then to distribute appropriate supply voltages and currents to the other balancer components. A control board 22 contains processing logic, data interface circuitry, and device interface circuitry to manage operation of the balancer, including performing the necessary balancer calculations. A user interface module 23 is coupled to the control board 22 and to the operator panel 12 so that the operator of the balancer can enter commands and receive prompts and information about operation of the balancer 10. A sensor module 24 is also coupled to the control board 22 to receive data from pressure or force imbalance transducers that is indicative of the balance conditions of a mounted wheel/tire assembly. An AC motor drive module 25 receives commands from control board 22 to provide for starting, stopping and speed control of the balancer motor.

Further details about, and embodiments of, an electronic wheel balancer that can be used as part of the present invention are shown in U.S. Pat. No. 7,882,738, the entire disclosure of which is incorporated herein.

Conventionally, electronic wheel balancers have used a wheel of certain size to calibrate the wheel balancer so that the balancer control logic can obtain the balance reference parameters before the user can use the wheel balancer to accurately balance a standard tire and wheel assembly.

What is needed is a method and apparatus for simplifying and fully automating the process for accurately calibrating an electronic wheel balancer.

BRIEF SUMMARY OF THE INVENTION

In one aspect, the present invention is a method of calibrating an electronic wheel balancer having a base unit, a motor shaft extending from the base unit, and a face plate attached to the shaft, the face plate including wheel mounting holes therein. In an embodiment, the method includes mounting a calibration wheel on the motor shaft, the calibration wheel comprising mounting pins configured to engage the mounting holes on the face plate; emitting a visible beam from an indicator light towards the calibration wheel, the beam indicating a home position for an inner plane calibration weight on the calibration wheel; rotating the calibration wheel to the home position; attaching an inner weight plane calibration weight to the BW at the home position; in response to an auto-calibration command, automatically rotating the balancer shaft to obtain sensor data from force transducers on the balancer; using the sensor data, automatically calculating and storing inner weight plane reference data; automatically stopping the motor shaft; and moving the inner plane calibration weight to an outer weight plane position on the calibration wheel.

DETAILED DESCRIPTION OF THE INVENTION

Figure 1:
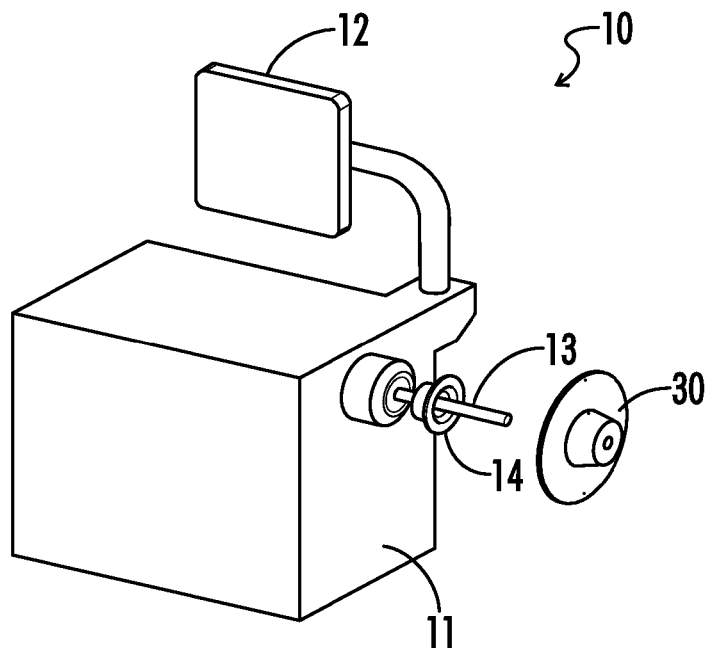
FIG. 1 is an isometric view of an electronic wheel balancer apparatus and a fully balanced calibration wheel, prior to assembly for auto-calibration in accordance with an embodiment of the present invention.
Figure 2:
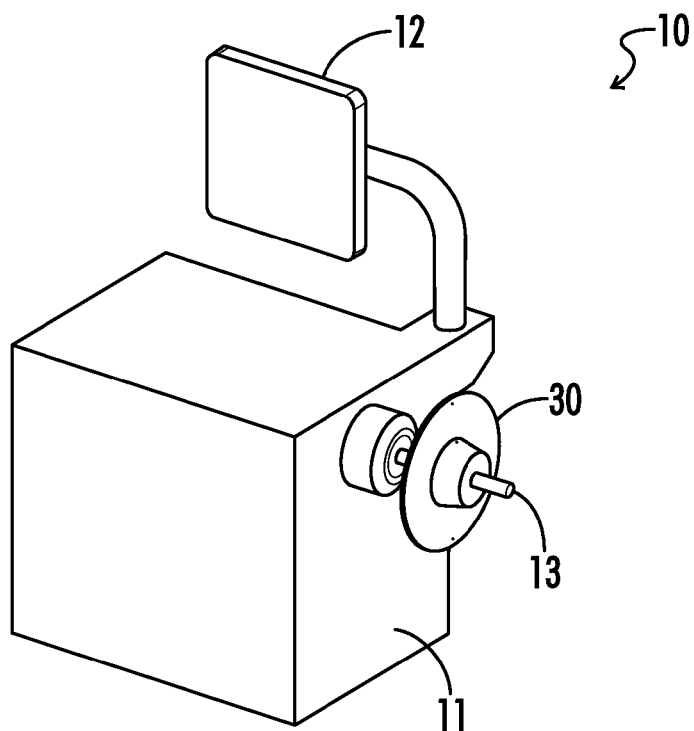
FIG. 2 is an isometric view of the wheel balancer apparatus and calibration wheel shown in FIG. 1, after the wheel is mounted for auto-calibration.

In an embodiment, the wheel balancer auto-calibration method and apparatus of the present invention includes a fully calibrated balanced wheel, or calibration wheel 30, fabricated of metal and/or rubber material and having a certain diameter and wheel width as shown in FIGS. 1 and 2. The calibration wheel mechanical parameters and the pressure transducer locations are known. The calibration wheel 30 of the present invention can be attached to the face plate 14 of a balancer easily, using pins 31 that engage corresponding holes on the face plate 14.

Figure 7:
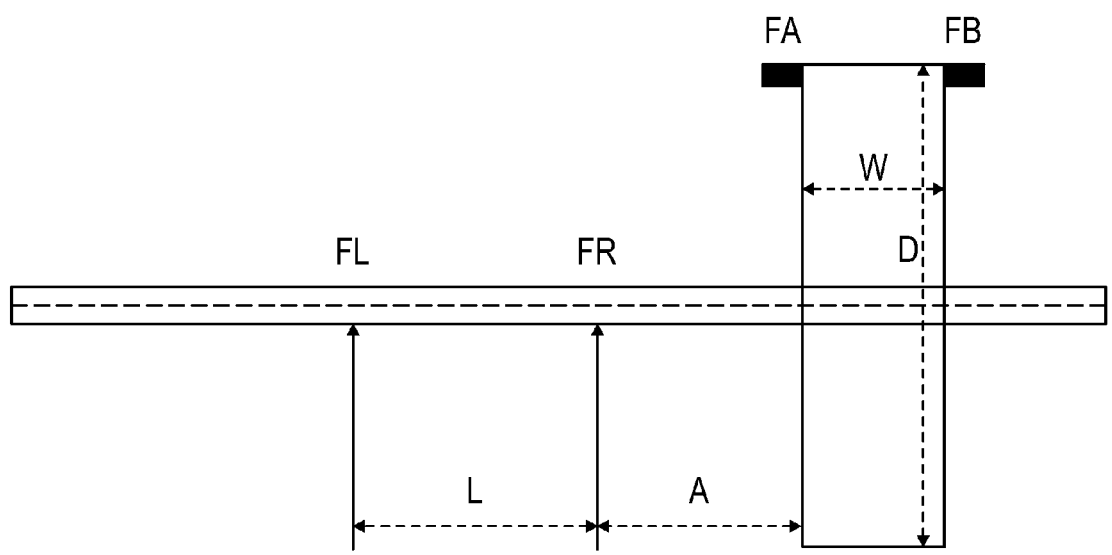
FIG. 7 is schematic view of a portion of the wheel balancer apparatus and calibration wheel of FIGS. 1-5, further showing an embodiment of the mechanical dimensions for the calibration wheel and pressure transducer positions.

Looking at FIG. 7, an embodiment of a pre-fabricated and fully balanced calibration wheel 30 is shown, having a width W and a diameter D. The reference FA designates the inner plane calibration weight location. The reference FB designates the external plane calibration weight location. The locations of two pressure transducers are designated by FL and FR respectively, separated by a distance L. The transducer location FR is separated by distance A to the inner weight plane.

To calibrate the balancer 10, the calibration constants, the calibration constants CL and CR must be determined for both pressure transducers. This can be done by measuring their respective transducer voltages VL and VR, with known parameters, FA, FB, A, L, and W, in accordance with the following equations:

$$CL = \{FA(A/L) + FB[(A+W)/L]\}/VL;$$

$$CR = -(FA[(L+A)/L] + FB[(L+A+W)/L])/VR;$$

When the calibration constants CL and CR are obtained, the calibration process is completed.

In an embodiment, the calibration wheel of the present invention includes first and second weight position holes that will allow the operator of the balancer 10 to attach or plug-in the calibration weights for auto-calibration. The calibration weight can be related to the wheel mass with certain mass ratio, Mw/Mw. In the disclosure of the present invention, the balanced calibration wheel 30 may also be referred to as a fully balanced wheel BW.

Figure 3:
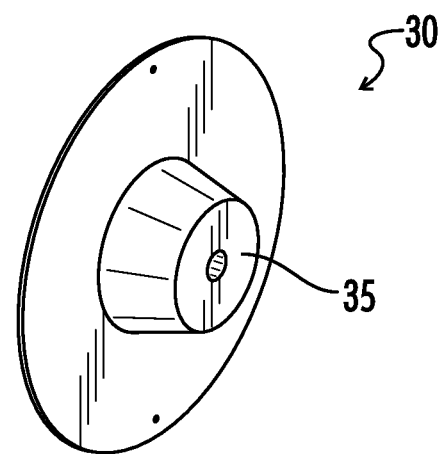
FIG. 3 is an isometric view of the calibration wheel of FIGS. 1 and 2, showing the face of the wheel opposite the wheel balancer apparatus.
Figure 4:
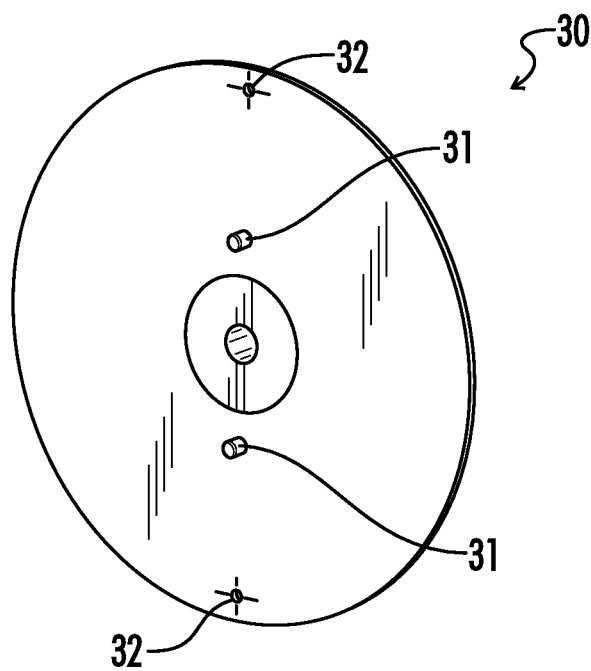
FIG. 4 is an isometric view of the wheel balancer side of an embodiment of the calibration wheel, further showing the indicator crosshairs and mounting pins for the balancer hub and the calibration weight position.
Figure 6:
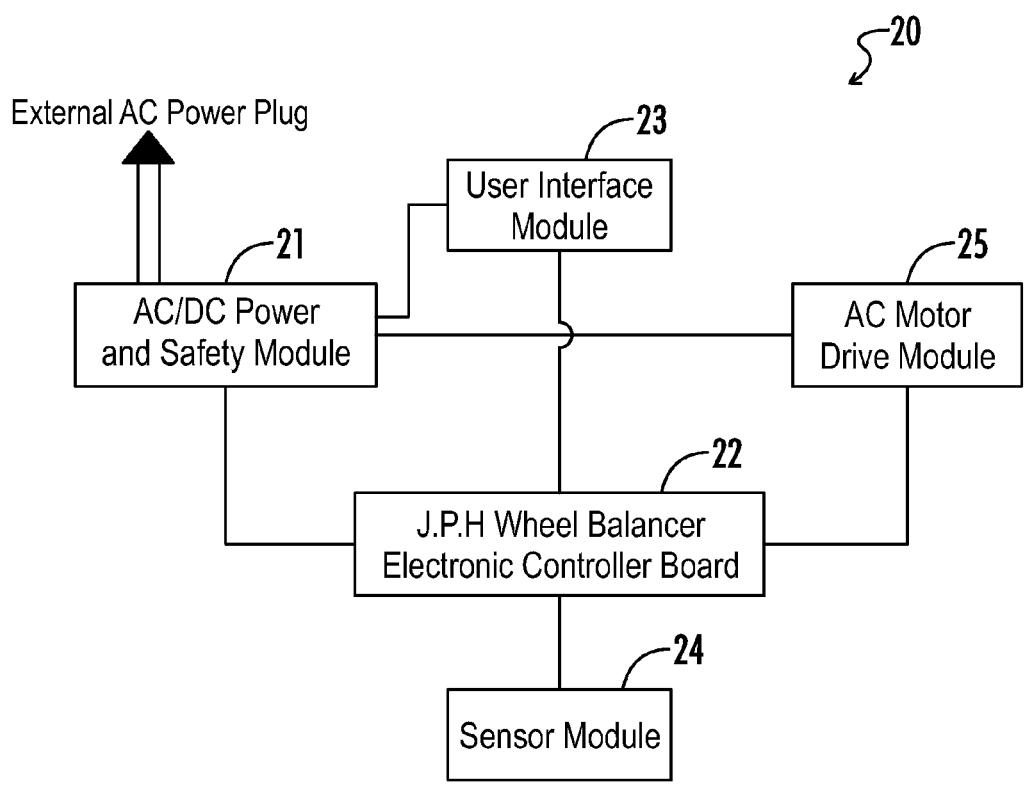
FIG. 6 is a block diagram of an embodiment of a control system for an electronic wheel balancer apparatus.

In an embodiment of the present invention, the balancer 10 is configured with a light source which can emit an indicator light beam to indicate the position of a calibration weight to be attached to the inner weight plane of the BW. This position may also be referred to as the Home Position or HP, and is determined to start the automatic calibration process. The indicator beam light source is controlled by the wheel balancer electronic control system 20 as shown in FIG. 6. FIG. 4 is an isometric view of the wheel balancer side of an embodiment of the calibration wheel 30, further showing the weight position indicator crosshairs 32 and mounting pins 31 for the balancer hub and the calibration weight positions respectively. FIG. 3 is an isometric view of the calibration wheel 30, showing the face of the wheel 30 opposite the wheel balancer 10, including a center mounting hub 35.

Figure 5:
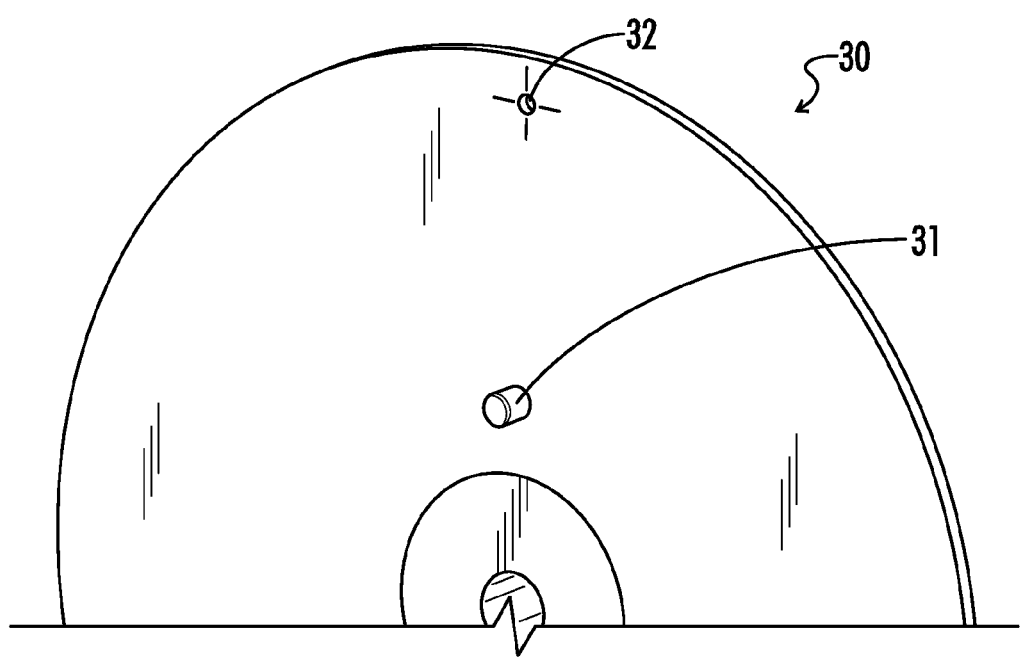
FIG. 5 is an enlarged isometric view of a portion of the calibration wheel embodiment of FIG. 4, showing the inner plane weight position indicator as a cross-hair at the top and bottom of the calibration wheel.

FIG. 5 is an enlarged isometric view of a portion of the calibration wheel 30, showing the inner plane weight position indicator as a cross-hair 31 at the top and bottom of the calibration wheel.

Figure 8:
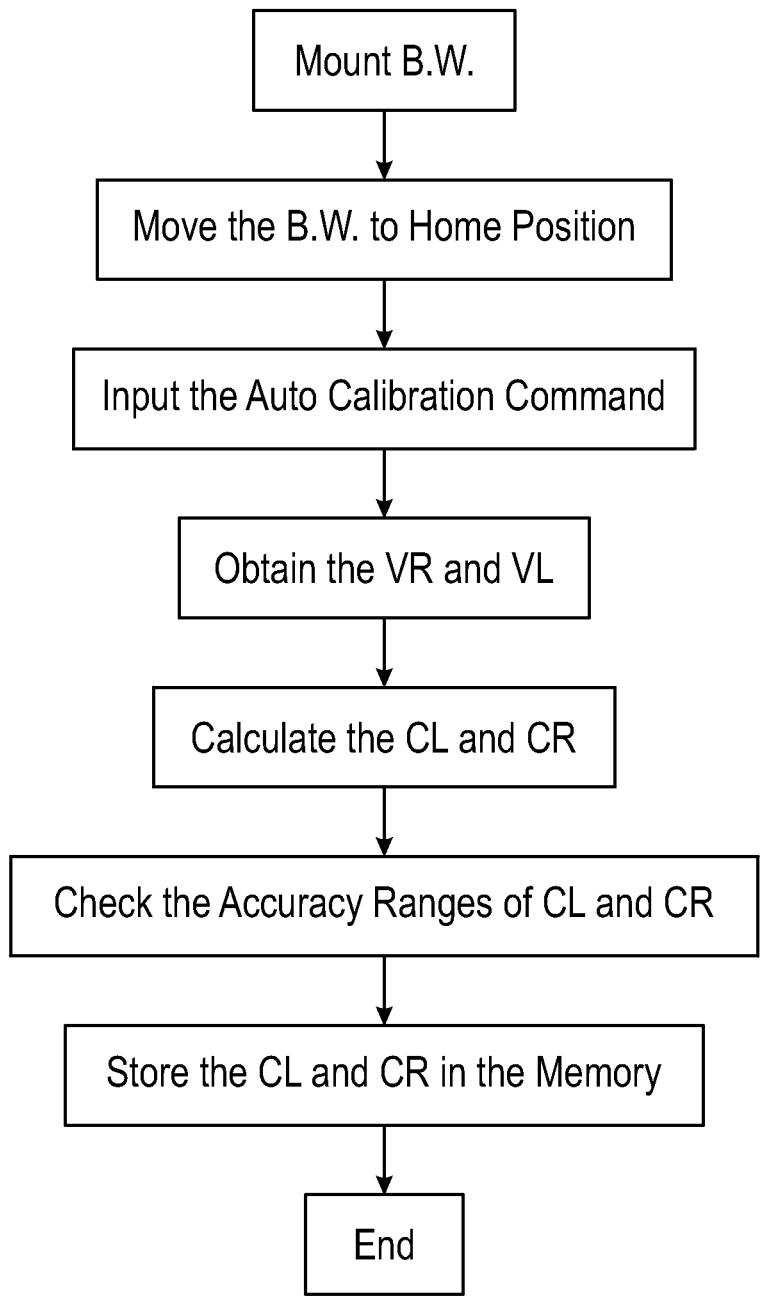
FIG. 8 is a flow chart of one embodiment of the auto-calibration method of the present invention.

Referring to FIG. 8, to implement the auto-calibration method of the present invention, the operator first performs a conventional mechanical arm calibration as is known in the art as part of the machine setup process. The BW is then mounted on the shaft 13 of the balancer 10. The operator will turn the BW to the inner plane weight position, or home position, indicated by the light from the balancer 10. The operator will attach the calibration weight to the BW and input the auto-calibration command into the user-interface module 23, using the operator panel 12. When the balancer processor on control board 22 receives this command, the auto-calibration will first obtain the inner weight plane reference data from the BW.

After the inner weight reference data is obtained and temporally stored, the balancer 10 will stop the motor and shaft automatically within a certain time interval so that the operator may remove the inner plane calibration weight and to attach it to the external plane position. The balancer shaft will rotate again and the external weight reference data will be automatically obtained. The automatic calibration process is now complete with valid results displayed by the user-interface module 23 and operator panel 12 of the balancer 10 after the temporary weight reference data is validated. The temporary stored weight reference data for the inner and outer planes will then be recorded in memory on the wheel balancer control board 22.

Thus, although there have been described particular embodiments of the present invention of a new and useful Auto Calibration Method and Apparatus for Wheel Balancer Equipment, it is not intended that such references be construed as limitations upon the scope of this invention except as set forth in the following claims.

What is claimed is:

1. A method of calibrating an electronic wheel balancer having a base unit, a motor shaft extending from the base unit, and a face plate attached to the shaft, the face plate including wheel mounting holes therein, the method comprising:
   mounting a calibration wheel on the motor shaft, the calibration wheel comprising mounting pins configured to engage the mounting holes on the face plate;
   emitting a visible beam from an indicator light towards the calibration wheel, the beam indicating a home position for an inner plane calibration weight on the calibration wheel;
   rotating the calibration wheel to the home position;
   attaching an inner weight plane calibration weight to the BW at the home position;
   in response to an auto-calibration command, automatically rotating the balancer shaft to obtain sensor data from force transducers on the balancer;
   using the sensor data, automatically calculating and storing inner weight plane reference data;
   automatically stopping the motor shaft;
   moving the inner plane calibration weight to an outer weight plane position on the calibration wheel;
   in response to a continue command, automatically rotating the balancer shaft to obtain sensor data from the force transducers;
   using the sensor data, automatically calculating and storing outer weight plane reference data.

* * * * *